United States Patent [19]

Mahoney

[11] 4,196,148

[45] Apr. 1, 1980

[54] HYDROLYSIS OF POLYURETHANE FOAMS

[75] Inventor: Lee R. Mahoney, Livonia, Mich.

[73] Assignee: Ford Motor Company, Dearborn, Mich.

[21] Appl. No.: 21,144

[22] Filed: Mar. 16, 1979

Related U.S. Application Data

[63] Continuation-in-part of Ser. No. 816,636, Jul. 18, 1977, abandoned.

[51] Int. Cl.² .................. C07C 85/20; C07C 85/26
[52] U.S. Cl. .................... 260/582; 260/2.3; 260/563 R; 260/570 D; 260/583 P; 260/584 R; 521/63; 521/918; 528/44; 528/67; 568/613; 568/675
[58] Field of Search ............ 260/578, 582, 570 D, 260/570 R

[56] References Cited

U.S. PATENT DOCUMENTS

| | | | |
|---|---|---|---|
| 3,225,094 | 12/1965 | Wolf | 260/570 R |
| 3,404,103 | 10/1968 | Matsudaira et al. | 260/2.3 |
| 3,441,616 | 4/1969 | Pizzini et al. | 260/615 |
| 3,478,099 | 11/1969 | Ross et al. | 260/570 D |
| 3,978,128 | 8/1976 | Meluch et al. | 260/570 D |
| 4,025,559 | 5/1977 | Johnson | 260/578 |
| 4,039,568 | 8/1977 | Sakai et al. | 260/570 D X |
| 4,051,212 | 9/1977 | Grigat et al. | 264/102 |

FOREIGN PATENT DOCUMENTS 967601  3/1955  Fed. Rep. of Germany ........... 260/582

OTHER PUBLICATIONS

Wertheim, "Organic Chemistry", third edition, pp. 261, 309 & 310, (1951).
Webster's Third New International Dictionary, p. 180, (1961).

*Primary Examiner*—John Doll
*Attorney, Agent, or Firm*—Edmund C. Ross, Jr.; Olin B. Johnson

[57] ABSTRACT

A method for hydrolysis of polyurethane foam and recovery of diamines and polyethers (or polyesters) from the hydrolysate carried out near atmospheric pressure and temperatures above about 185° C. in a reaction zone containing water vapor which comprises increasing the rate of diamine production by inclusion of a minor, but effective amount of ammonia in the reaction zone. Volitilized diamines separated from the foam are preferably removed from the reaction zone, e.g. in an overhead stream, while polyethers (or polyesters) separated from the foam are recovered as liquid bottoms from the reaction zone.

8 Claims, 1 Drawing Figure

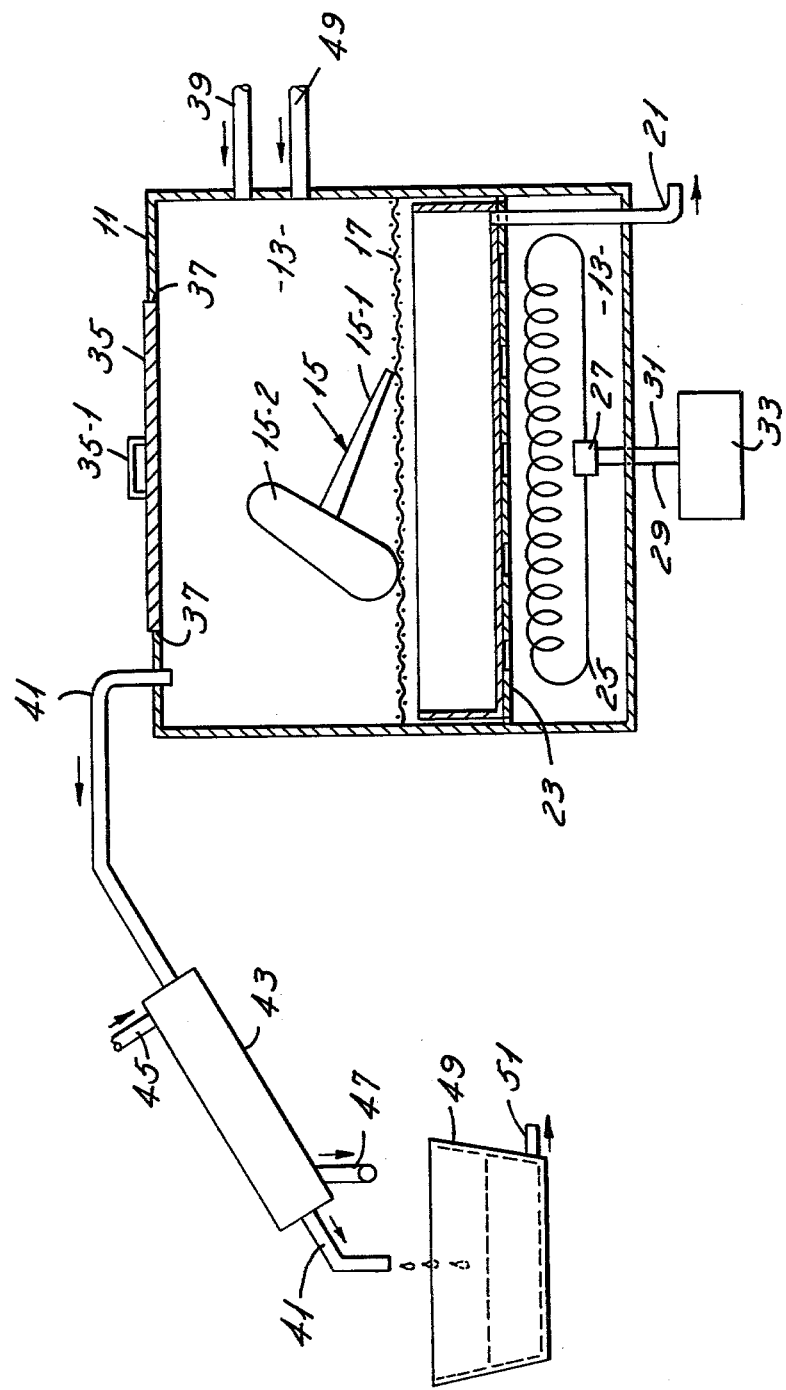

HYDROLYSIS OF POLYURETHANE FOAMS

This is a continuation in part of U.S. Ser. No. 816,636, filed July 18, 1977 in the name of L. R. Mahoney, now abandoned.

BACKGROUND OF THE INVENTION

Increased industrial use of polyurethane foam continues to create a growing disposal problem.

A very large quantity of "new" polyurethane foam scrap is generated by industrial plants engaged in the manufacture of articles, e.g., seating, which employ foam as a cushioning element. In such operations, up to about 30 percent of the starting material may end up as scrap. A limited market exists for a portion of this new scrap.

A very large and increasing quantity of "used" polyurethane foam scrap is a product of automobile shredders which have as their primary function the recovery of metal from junked automobiles for recycling. The present method of disposal of non-metallic reject from such shredders is by sanitary land fill. Aside from the complete loss of the value of such foam in this method of disposal, the increasing volume of such scrap and the cost and availability of nearby land fill sites will soon create a major disposal problem.

Another source of waste polyurethane foams is to be found in factory rejects of items having a base of metal supporting polyurethane foam formed in place. Removal of this foam to permit reuse of the supporting base often has been uneconomical with resultant loss of the value of the supporting base in addition to creating a problem of disposing of both base and foam.

U.S. Pat. No. 3,225,094 issued to Wolf in 1965 relates to hydrolysis processes. Also, of interest may be U.S. Pat. Nos. 3,404,103 and 3,441,616.

THE INVENTION

The overall rate at which diamines are produced in hydrolysis of polyurethanes at temperatures above about 185° C. and pressures in a range from about 0.5 to about 1.5 is increased through inclusion of effective amounts of ammonia in the reaction zone. Preferably, the temperature in the reaction zone is in a range of from about 220° C. to about 275° C. although higher temperatures e.g. 300° C. may be employed. Further, total pressures up to about 2 atmospheres are preferred, e.g. 0.5–1.25 in the reaction zone.

The concentration of water vapor and ammonia in the reaction zone is advantageously maintained such that their combined partial pressure is between 380 mm. Hg to 1140 mm. Hg. The density of essentially all such foams fall within the range of about 2 to about 64 lbs./ft$^3$. About 1 part of water per 100 parts of foam is necessary for complete hydrolysis. Thus, about 0.2 to about 6.4 lbs. water is eventually required for complete hydrolysis of one pound of polyurethane, if ammonia is not present. In the more preferred aspects of this invention, only very minor amounts of ammonia are surprisingly required and the amount of water required remains about the same.

Polyurethane foams are typically prepared by reacting a polyether, e.g., polypropylene oxide with ethylene oxide cap, with a diisocyanate, e.g., toluene diisocyanate, in the presence of an amine catalyst, e.g., methyl morpholine or N,N - diethyl ethanolamine, and a small amount of water. This reaction mixture will commonly include in minor amounts a chlorinated aromatic amine, e.g., 4,4' - diamino, 3,5,3',5' tetrachloro diphenyl methane, and an emulsifying agent, e.g., an alkyloenzene sulfonate - triethanolamine salt.

Other polyurethane foams are prepared from diisocyanates and polyesters, e.g., esters of polyhydric alcohols, e.g., 1,4 butane diol, with polycarboxylic acids, e.g., adipic acid.

If the reaction is carried out in the presence of an activating mixture, which includes water or an equivalent agent for hydrolyzing the diisocyanate, the accompanying evolution of carbon dioxide makes the mixture self-foaming so that the resulting resin block has a foam-like or cellular structure. In addition to water, such activating mixture includes generally an accelerator such as an amine, an emulsifying agent such as a sulfonated oil and an agent such as paraffin oil for regulating the pore size in the resin foam.

Polyurethane foam production is described, for instance, in Polyurethanes, Chemistry and Technology, by J. H. Saunders and K. C. Frisch, Part II Technology, Interscience Publishers, New York (1967).

In the method of this invention, a gaseous effluent from the reaction zone contains diamines separated from the polyurethane foam in the reaction zone by hydrolysis and can be removed overhead or as a side stream, preferably overhead cooled and recovered as a solution of diamines in water. The diamines may then be recovered from the water by distillation. Diamines can be converted to diisocyanates by reaction with phosgene. The diisocyanates thus produced can be used as a reactant in the preparation of polyurethane foam or other useful products. A liquid product of the hydrolysis of polyurethane collects below the polyurethane and can be recovered from the lower part of the reaction zone. When the polyurethane undergoing hydrolysis is one prepared from diisocyanates and polyethers, this bottoms product will consist essentially of polyethers with pendant reactive groups, e.g., polypropylene oxide with free amino, urethane and hydroxyl groups.

The amount of ammonia employed is that amount effective to increase the overall rate of the diamine recovery. By overall rate is meant herein, and in the appended claims, the amount of diamine produced per total time elapsed during hydrolysis. Surprisingly, this amount of ammonia is a catalytic amount which can be very small in many instances e.g., less than 0.05 or smaller mole of ammonia per mole of water vapor introduced into the reaction zone, although larger amounts, e.g., up to about 0.1 more or higher of ammonia for each mole of water vapor may be employed effectively. A preferred range is below about 0.20 moles of ammonia for each mole of water vapor, more preferably up to about 0.05 moles (e.g., 0.005) of ammonia for each mole of water introduced into the reaction zone, particularly at temperatures about 220° C. A range above about 0.001 moles ammonia per mole water vapor is seen as desirable.

DETAILED DESCRIPTION OF THE DRAWING AND PREFERRED EMBODIMENT

The drawing is a schematic view, partially in section, showing one arrangement of apparatus suitable for carrying out the method of this invention.

In the drawing, reactor housing 11 encloses a hydrolysis zone 13. Situated in hydrolysis zone 13 is a (factory-reject) head rest 15 for occupants of automobiles which consists of a metal frame 15-1 which is in part covered by a polyurethane foam pad 15-2. Pad 15-2 is tenaciously adhered to metal frame 15-1 and constitutes the material to by hydrolyzed in this method. Head rest 15 is here shown resting on wire mesh support member 17. Immediately below support member 17 is collecting tank 19 which is constructed and arranged to receive liquid hydrolysate from polyurethane pad 15-2. Collecting tank 19 is in fluid communication with outlet conduit 21 through which liquid hydrolysate comprising polyethers (or polyesters) can be withdrawn from collecting tank 19 and reactor housing 11. Optionally, the liquid hydrolysate may be removed from collecting tank 19 through a side-stream conduit, not shown. Collecting tank 19 is supported by grid support member 23. Positioned below grid support member 23 is a heating element 25 which is operatively connected with a temperature sensing and temperature control unit 27, e.g., a thermostat. Unit 27 is operatively connected via conductors 29 and 31 to an electrical (AC) power source 33. When the method of this invention is being carried out, the temperature of hydrolysis zone 13 is maintained between 200° C. and 300° C. via heating element 25, temperature sensing and temperature control unit 27, conductors 29 and 31 and electrical power source 33. It will be understood by those skilled in the art that invention here does not lie in the use of this or any other particular heat and heat control means but that any suitable means for maintaining the temperature of hydrolysis zone 13 within the prescribed range can be used.

Reactor housing 11 is here shown equipped with a removable cover 35 having a handle 35-1. When cover 35 is removed, polyurethane foam or objects such as the illustrated head rest can be lowered into hydrolysis zone 13 through opening 37 to wire mesh support member 17, and, in the case of the latter, removed from hydrolysis zone 13 when the polyurethane has been hydrolyzed from the object. This arrangement is suitable for a batch type operation or a continuous operation with intermittent feeding of polyurethane to hydrolysis zone 13. It is also within the scope of this invention to operate the method with intermittent feeding of polyurethane via conveyor means introducing the polyurethane foam into hydrolysis zone 13 via bottom or side inlet means, not shown. In the case of scrap polyurethane which is not attached to metal parts, the scrap may be fed continuously into hydrolysis zone 13 via inlet conduit means not shown.

Reactor housing 11 is in fluid communication with inlet conduit 39 through which water vapor, e.g., superheated steam is continuously or intermittently introduced into hydrolysis zone 13. The ammonia is introduced into the hydrolysis zone through conduit 40. The amount of ammonia and water entering the hydrolysis zone is metered through metering devices in conduits 39 and 40, respectively, not shown, to provide the desired total pressure at the temperature maintained in the hydrolysis zone.

It is to be understood, of course, that the ammonia and water vapor also may be introduced into the hydrolysis zone in alternative manners. For example, the ammonia and water vapor is advantageously for certain purposes introduced by evaporating a solution of ammonia and water and passage through a single conduit to the reaction zone. It is desirable, for control purposes to pass the evaporated ammonium hydroxide through a pre-heating stage to provide it at desired temperatures to the reaction zone (e.g., hydrolysis zone). Such is easily accomplished with conventional equipment.

In the hydrolysis of polyurethane, diamines are released in gaseous state and these together with water vapor and ammonia exit overhead from hydrolysis zone 13 via outlet conduit 41. Outlet conduit 41 passes through condenser 43 wherein a gaseous effluent from hydrolysis zone 13 is cooled and condensed to a liquid by a flow of water through condenser 43 which is continuously introduced via water inlet conduit 45 and continuously removed via water outlet conduit 47. The now liquified effluent from hydrolysis zone 13 comprises diamines and water which empty to gravity flow from conduit 41 into collecting tank 49. The liquid collection in collecting tank 49 is removed therefrom via outlet conduit 51 for separation and recovery of the diamines.

In the embodiment illustrated in the drawing, hydrolysis zone 13 is maintained at a pressure of substantially one (1) atmosphere, i.e., between 1 and 1.5 atmospheres. It is also within the scope of this invention to carry out this method in a hydrolysis zone which is under a partial vacuum, i.e., between 0.5 and 1 atmosphere. It is to be understood that the principles of this invention are also applicable to other devices which can be employed to hydrolyze polyurethane foams. For example, the device of U.S. Ser. No. 315,976, filed Dec. 18, 1972, now U.S. Pat. No. 4,025,559 can be modified to utilize the beneficial addition of ammonia to the reaction zone therein. Accordingly, this patent is herein incorporated by reference. The modification entails simply introducing ammonia and water vapor rather than steam alone into the reaction zone through the inlet that is shown in that specification for water alone.

This invention will be more fully understood from the following examples:

EXAMPLE I

In this example, six separate runs are made in order to illustrate the effectiveness of ammonia in steam hydrolysis of polyurethane, as previously described.

In each run, a standard sample of a polyurethane foam (density 2.1 lb./cu. ft.) is exposed (in a device as shown by FIG. 1) in the hydrolysis zone to either steam or steam and ammonia. The temperature is maintained at 270° C. and the pressure is one atmosphere for all runs. In those runs using ammonia, the gaseous ammonia and water vapor are introduced from a tank of compressed ammonia and a water boiler. The amount of diamine collected from the overhead exit conduit is determined by spectrophotometic analysis after it is separated from the cooled exhaust vapors. The liquid polymeric product derived, as described above, is also collected.

At the end of 5, 10, 20 and 40 minute intervals, the total amount of diamine recovered is determined. The theorectical yield of the toluene diamine for this polyurethane is 18.7 parts by weight for each 100 parts of this diamine foam.

Shown below in Table I are the results of Runs A, B, C, D and E. In Run A, no ammonia is employed. In Runs B, C, D and E, the molar ratio of ammonia to water in the hydrolysis zone is:
  Run B 0.006
  Run C 0.02
  Run D 0.50
  Run E 1.05

The results in Table I are based upon the total grams of toluene diamine recovered (per 100 grams foam) at the end of each time interval.

TABLE I

| TIME | A | B | C | D | E |
|---|---|---|---|---|---|
| 5 | 10.8 | 13.6 | 13.3 | 12.8 | 9.8 |
| 10 | 13.3 | 16.0 | 15.3 | 14.0 | 11.2 |
| 20 | 14.9 | 17.5 | 16.7 | 15.1 | 12.8 |
| 40 | 15.9 | 18.5 | — | 16.0 | 13.7 |

EXAMPLE II

In this example, the procedure of Example I is followed except the temperature is maintained in the hydrolysis zone at 260° C. Results are obtained showing the effectiveness of inclusion of ammonia in the hydrolysis zone.

EXAMPLE III

In this example, the procedures of Example I are generally followed except rather than introducing a separate stream of ammonia into the reaction zone, a solution of ammonium hydroxide is evaporated and passed into the reaction zone through a single conduit to provide effective ammonia and water vapor concentrations. Also, the polyurethane sample that is hydrolyzed during the course of the individual experimental runs is preheated by placing it in contact with a stream of nitrogen gas at a temperature just below that for hydrolysis. This heating in nitrogen gas eliminates the time required to heat up the sample of polyurethane by the ammonia and water vapor and allows greater precision in the calculation of kinetic rates for hydrolysis of the polyurethane. As the ammonia and water vapor are introduced, the nitrogen stream is stopped.

Shown below in Table II are the results of Runs F–I and J–M. Runs F and J are controls and are made with no ammonia present. Runs F–I are made at a temperature of 190° C. in the hydrolysis zone. Runs J–M are made at a temperature of 250° C. The relative molar ratio of ammonia to water vapor introduced in each of the Runs is as follows:

Runs F and J Control - 0.0
Runs G and K 0.00075
Runs H and L 0.005
Runs I and M 0.05

| TIME | F* | G* | H* | I* |
|---|---|---|---|---|
| 5 | .77 | .67 | .795 | 1.0 |
| 10 | 1.40 | 1.36 | 1.61 | 1.9 |
| 15 | 2.06 | 1.95 | 2.256 | 2.6 |
| 20 | 2.54 | 2.42 | 2.76 | 3.17 |
| 45 | 3.90 | 3.71 | 4.18 | 4.9 |

| TIME | J** | K** | L** | M** |
|---|---|---|---|---|
| 2 | 3.92 | 3.67 | 7.0 | 3.30 |
| 4 | 6.16 | 5.87 | 9.56 | 5.81 |
| 6 | 7.62 | 7.11 | 11.1 | 7.50 |
| 8 | 8.84 | 8.00 | 12.3 | 8.70 |
| 10 | 9.9 | 8.80 | 13.2 | 9.72 |
| 20 | 13.52 | 11.4 | 15.9 | 12.21 |
| 35 | — | 13.8 | 17.3 | — |
| 40 | 17.7 | — | — | 14.7 |

*at 190° C.
**at 250° C.

The polyurethane foam in Examples I–III is made by reacting a composition consisting essentially of toluene diisocyanates with essentially ester free tri hydroxy poly-ether.

What is claimed is:

1. A method of hydrolysis for polyurethane foam in a reaction zone and recovery of diamine and liquid polymeric product at pressures of from about 0.5 to about 1.5 atmospheres, which comprises introducing into the reaction zone, which is maintained at a temperature above about 185° C., an amount of gaseous ammonia effective to increase the overall rate of diamine recovery wherein the polyurethane is made from reacting polyisocyanate and polyol.

2. The method according to claim 1, wherein the temperature is maintained in the reaction zone below 300° C.

3. The method according to claim 2, wherein there is introduced up to about 0.1 mole of ammonia for each mole of water vapor into the reaction zone.

4. The method according to claim 3, wherein the diamine and liquid polymeric product are recovered simultaneously.

5. The method according to claim 4, wherein the pressure of ammonia and water vapor in the reaction zone is about one atmosphere.

6. The method according to claim 5, wherein there is less than about 0.05 moles of ammonia introduced for each mole of water vapor into the reaction zone and the temperature in the reaction zone is in a range between about 220° C.–275° C.

7. The method according to claim 6, wherein the ammonia and water vapor are introduced into the reaction zone simultaneously.

8. The method according to claim 1, wherein the pressure in the reaction zone is about 0.5–1 atmosphere; the temperature is in a range of from about 220° C. to about 275° C.; and the molar ratio of ammonia to water vapor introduced is up to about 0.05.

* * * * *